United States Patent

Szewczyk et al.

(10) Patent No.: US 7,680,730 B2
(45) Date of Patent: Mar. 16, 2010

(54) DOWNSTREAM CORRESPONDENT FOREIGN EXCHANGE (FX) BANKING

(75) Inventors: Patrick F. Szewczyk, Huntersville, NC (US); Carissa Mosteller Burns, Belmont, NC (US); Alicia Carmen Tiracave, Charlotte, NC (US); Michael J. McCallion, Saluda, NC (US); Jeremy Keith Thomason, Gastonia, NC (US)

(73) Assignee: Wells Fargo Bank N.A., San Francisco, CA (US)

( * ) Notice: Subject to any disclaimer, the term of this patent is extended or adjusted under 35 U.S.C. 154(b) by 0 days.

(21) Appl. No.: 11/762,484

(22) Filed: Jun. 13, 2007

(65) Prior Publication Data

US 2008/0313076 A1    Dec. 18, 2008

(51) Int. Cl.
*G06Q 40/00* (2006.01)
(52) U.S. Cl. .......................... 705/39; 705/42
(58) Field of Classification Search .............. 705/39
See application file for complete search history.

(56) References Cited

U.S. PATENT DOCUMENTS

| | | | | |
|---|---|---|---|---|
| 5,787,402 | A * | 7/1998 | Potter et al. | 705/37 |
| 6,856,970 | B1 * | 2/2005 | Campbell et al. | 705/35 |
| 7,269,575 | B1 * | 9/2007 | Concannon et al. | 705/39 |
| 7,540,408 | B2 * | 6/2009 | Levine et al. | 235/379 |
| 2001/0034682 | A1 * | 10/2001 | Knight et al. | 705/35 |
| 2004/0111356 | A1 * | 6/2004 | Srivastava et al. | 705/37 |
| 2005/0209961 | A1 * | 9/2005 | Michelsen et al. | 705/39 |
| 2006/0015453 | A1 * | 1/2006 | Kulasooriya et al. | 705/39 |
| 2006/0106701 | A1 * | 5/2006 | Ayala et al. | 705/35 |
| 2008/0154771 | A1 * | 6/2008 | Trickey et al. | 705/44 |

OTHER PUBLICATIONS

Kraus, James. R, "A New Law Has U.S. Banks Looking to Mexico", American Banker- Dec. 16, 1998; p. 1; vol. 163, No. 239.*
Boraks, David, "Overseas, Wachovia Stays Course", American Banker- Sep. 27, 2002; p. 1; vol. 167, No. 186.*
J.P. Morgan, "China: an evolving market", Asian Money, May 2003, v 14. n 4. p. 32.*

(Continued)

*Primary Examiner*—Hani Kazimi
*Assistant Examiner*—Mohammad Z Shaikh
(74) *Attorney, Agent, or Firm*—James J. Pingor; Driggs, Hogg, Daugherty & Del Zoppo Co., LPA

(57) ABSTRACT

Systems and methods that enable real-time (or almost real-time) foreign exchange (FX) pricing via retail branch networks, wire room operations and cash management platforms are provided. Essentially, the systems and methods decouple the FX-infrastructure and enable downstream banks to effectively and efficiently access FX transaction services and infrastructure without the need to locally manage such an FX platform. In doing so, an FX generation component is employed in connection with standard downstream mechanisms to provide necessary information to a partner FX processing component. The partner FX processing component conveys information to the downstream environment while shielding the downstream entity from risks and costs involved in FX operations.

19 Claims, 10 Drawing Sheets

OTHER PUBLICATIONS

FUNDtech Your strongest link. International ACH: A World of Opportunities. http://www.analystcentre.com/newanalystaccess/Companies/FUNDtech/FUNDtechNews.htm# . Last accessed Jul. 29, 2008.

SWIFT. Company Information. http://www.swift.com/index.cfm?item_id=41322. Last accessed Jul. 29, 2008.

Stephanie De La Fouchardiere. The Implications of SWIFTNet for Corporate Treasurers—Breaking New Ground in e-Banking. BNP Paribas Case Management. TMI International Case Management 2003, Special Report.

\* cited by examiner

DOWNSTREAM CORRESPONDENT FOREIGN EXCHANGE (FX) BANKING

BACKGROUND

In the financial industry, 'foreign exchange' or FX markets refer to transactions or deals where one country's currency is traded for another (based upon a current or projected exchange rate). As can be imagined, worldwide, this trading market is an ever growing market where accuracy and projections are keys to success. Today, FX trading is a lucrative market for large banks, reserve or central banks, currency traders, corporations, governments, and other institutions. For instance, on average, it is believed that worldwide FX trades exceed two trillion dollars per day, and continues to grow.

With this lucrative market comes a great amount of risk for the traders. For example, economic conditions and political stability are at least two factors that effect trading. In other words, knowledge is key to trading decisions as well as to project when to make the decisions. Economic policies (e.g., fiscal policies, monetary policies, interest rates) are most often propagated by governments and, as a result, effect economic conditions and thereafter trading values.

Similarly, political conditions can affect currency markets around the globe. For instance, instability within a government can perpetuate a negative impact on nation's economy. Likewise, a perceived fiscally responsible government can project a positive impact on the nation's economy. Both of these situations can contribute to FX trade values respectively.

In the FX markets, there are several types of financial instruments commonly used in trading. These transactions include 'forward', 'future', 'spot' and 'option' transactions. Each of these types of transactions shares unique risks and rewards. As such, managing an FX portfolio can be extremely lucrative or, alternative devastating to the financial viability of an entity.

A 'forward' transaction can assist in managing risk associated with FX markets. More particularly, because funds do not transfer until a future date, risk can most often be managed more easily. Here, the parties to the transaction (e.g., buyer and seller) reach agreement on an exchange rate which is consummated on a date in the future. With regard to 'forward' transactions, the transaction is completed on the agreed upon date, regardless of the market rates on that date. One common type of 'forward' transaction is a 'currency swap', where parties agree to exchange currencies for a certain length of time and to the reverse the same at a later date.

In the FX markets, a 'future' refers to a 'forward' transaction with standard contract sizes and maturity dates. As an example, parties can agree to transfer X dollars next September at an agreed upon exchange rate. Traditionally, 'futures' are traded on a specific exchange.

A 'spot' transaction is a two-day delivery transaction, as opposed to the aforementioned 'futures,' which are usually at least three months. A 'spot' trade refers to a direct exchange between two currencies. In other words, 'spot' trades involve cash rather than a contract as in other types of financial transactions. As such, the 'spot market' is a commodities or securities market where goods (e.g., foreign currency) are sold for cash.

When transferring funds worldwide, today, the industry has developed and standardized upon SWIFT, Society for Worldwide Interbank Financial Telecommunications. Similar to the FED (or the Federal Reserve System) for domestic transactions, SWIFT is a secure financial messaging network that can be used to communicate FX messages securely and reliably between global financial institutions. Additionally, SWIFT is also a vendor of software and services to financial institutions who desire to participate in the FX markets. Essentially, SWIFT provides common standards for financial transactions as well as a shared data processing system and worldwide communications network.

Accordingly, becoming SWIFT-enabled is not an easy or inexpensive task. For at least this reason, many financial institutions rely upon larger and more equipped financial institutions to assume risk, build the necessary infrastructure (e.g., SWIFT network) and assist in FX transactions. Unfortunately, although smaller institutions can participate in the FX market by relying upon larger, more capable institutions, without a common framework, this reliance requires extensive and multiple manual processes which, as can be imagined, add to cost, inefficiencies and frequently, human error.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises systems and methods that employ downstream correspondent solutions to request real-time (or near real-time) foreign exchange (FX) pricing from FX-equipped entities via a standard (e.g., domestic) wire room application. In other words, a non-FX-enabled downstream entity can leverage FX-enabled architectures and network capabilities of a partner entity without the need to build the FX-infrastructure within the downstream environment. In an example, an FX request can be generated by the downstream entity utilizing existing wire room solutions. This FX request can be sent to the FX-enabled partner whereby the partner can return pricing in real-time (or near real-time). If approved or accepted, a secure message with payment instructions can be sent to the FX-enabled partner for consummation of the FX transaction on behalf of the downstream entity.

In another aspect of the subject innovation, suppose an FX-enabled entity has a client set of downstream banks that have a regular need for access to FX market to serve their own customers but, unfortunately, the downstream banks do not have the necessary FX volume to justify developing an FX infrastructure. The innovation provides a seamless solution that enables these downstream entities to leverage and use the FX infrastructure of the FX-enabled entity.

In some instances, the downstream banks may have some of the components needed but lack the complete package in order to effectuate FX transactions. Here, the subject innovation enables these downstream banks to effectively and efficiently offer FX markets to their clients without the need to manage risks and infrastructures involved in being FX-enabled.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
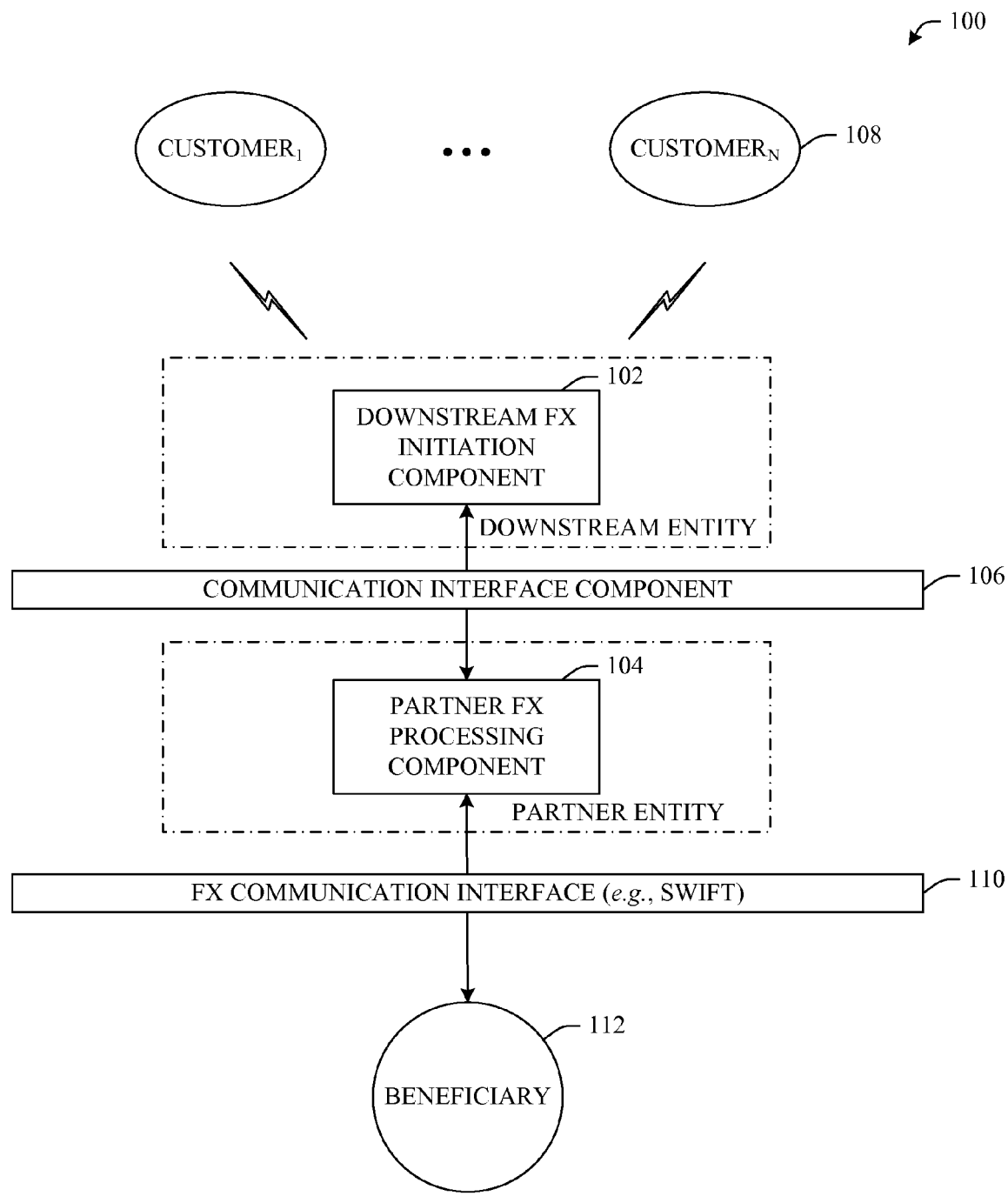
FIG. 1 illustrates a system that enables a downstream entity to leverage foreign exchange (FX) capabilities of a partner entity in accordance with an aspect of the innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring initially to the drawings, FIG. 1 illustrates a system 100 that decouples components that facilitate foreign exchange (FX) transactions in accordance with aspects of the innovation. As described supra, conventionally, in order to effectively and efficiently process FX transactions, an entity (e.g., financial institution) had to commit time and expense to build infrastructure capable of securely transferring funds globally and to manage the risks associated with FX practice. Alternatively, a financial institution can be forced to manually undertake multiple tasks in order to complete a single FX transaction. Unfortunately, in lieu of establishing an FX infrastructure, the need for these multiple manual operations often deter financial institutions from participating in the FX markets, e.g., due to the expense and risk management involved.

As shown in FIG. 1, system 100 can generally include a downstream FX initiation component 102 and a partner FX processing component 104 that facilitate downstream correspondent banks to offer FX infrastructure network services without the need to locally establish an FX infrastructure. In other words, the downstream FX initiation component 102 can communicate with a remotely located partner FX processing component 104 by way of a communication interface component 106. It is to be understood that this communication interface component 106 can be representative of a dedicated link or channel between a downstream bank (or group of downstream banks) and a partner (e.g., partner FX processing component 104).

The following scenario is included to add perspective to the innovation and is not intended to limit the innovation in any way. Rather, it is to be appreciated that other examples exist that are to be included within the scope of this specification and claims appended hereto. By way of example, in operation, customers 108 can visit or contact a downstream bank (e.g., regional bank) to prompt an FX transaction, regardless if the downstream bank has FX-capable network facilities (e.g., SWIFT-enabled (Society for Worldwide Interbank Financial Telecommunications)). For instance, an enterprise customer can use a regional bank to pay an account in some currency foreign to the customer 108 itself. As shown, it is to be understood that a downstream bank (e.g., downstream FX initiation component 102) can service 1 to N customers, where N is an integer.

In operation, a customer 108 can communicate with a downstream FX initiation component 102 of a downstream bank to request or initiate an FX transaction. As will be understood, this communication can be remote (e.g., via a network, telephone, Internet) or in person (e.g., visiting the downstream entity). Regardless of how the initiation takes place, the FX transaction can be generated by way of the downstream FX initiation component 102. This component (102) can communicate to a partner FX processing component 104 via a communication interface component 106. The communication interface component 106 can provide secure, and if desired, dedicated, communication between the two components (102, 104).

It is to be understood and appreciated that the data traffic (e.g., FX-related information) transmitted between the two components (102, 104) can be cryptographically protected to alleviate risk of unwanted, accidental or even malicious interception or delivery. Accordingly, most any mechanism known in the art can be employed to secure communications between the two environments (e.g., downstream entity and partner entity). In one example, a public/private key pair can be employed to ensure delivery and decryption by the correct and intended target.

Once the FX transaction is initiated, the downstream FX initiation component 102 can prepare and send a message to the partner FX processing component 104 to request FX information. Accordingly, messages are sent between to the two entities to offer, accept and, if accepted, to provide necessary transfer details (e.g., beneficiary deposit information, debit information). Once the transfer is accepted, the partner FX processing component 104 can facilitate transfer of the funds by way of an FX communication interface 110 (e.g., SWIFT network) to the proper beneficiary 112. It is to be understood and appreciated that the system 100 can maintain all payment detail such that it is easily accessible for transaction reports and audit trails, if necessary or desired.

As described above, when transferring funds worldwide, many financial institutions have standardized upon the SWIFT protocol and corresponding network to effectuate the necessary actions to securely and accurately complete foreign deals or transactions. Similar to the FED (or the Federal Reserve System) for domestic transactions, SWIFT is a secure financial messaging protocol and network that can be used to communicate FX messages securely and reliably between global financial institutions. Moreover, SWIFT also supplies software applications and services to financial institutions who desire to participate in the FX markets. Overall, SWIFT provides common standards for financial transactions as well as a shared data processing system and worldwide communications network which facilitate effectuating foreign currency transfers, debits, deposits and exchanges.

Unfortunately, infrastructures such as SWIFT require a substantial monetary outlay which is oftentimes not economically justified by financial institutions. For instance, if a financial institution does not have the volume of foreign transactions from its customers, the economic commitment may not make business sense. For at least this reason, many financial institutions rely upon larger and more equipped financial institutions to assume risk and effectuate foreign transactions. These financial institutions can most often justify building the necessary infrastructure (e.g., SWIFT network) which enables them to assist in FX transactions. Unfortunately, although smaller institutions can participate in the FX market by relying upon larger, more capable institutions, without a common framework, conventionally, this reliance required extensive and multiple manual processes which, as can be imagined, add to cost, inefficiencies and frequently, human error.

The subject system 100 alleviates these manual processes by providing components (e.g., downstream FX initiation component 102 and partner FX processing component 104) on either side of the transaction which enable secure communication to effectuate the foreign transfers. Thus, by employing the subject system 100, less equipped financial institutions (e.g., smaller non-SWIFT-enabled banks) are able to leverage the infrastructure of a SWIFT-enabled financial institution.

Figure 2:
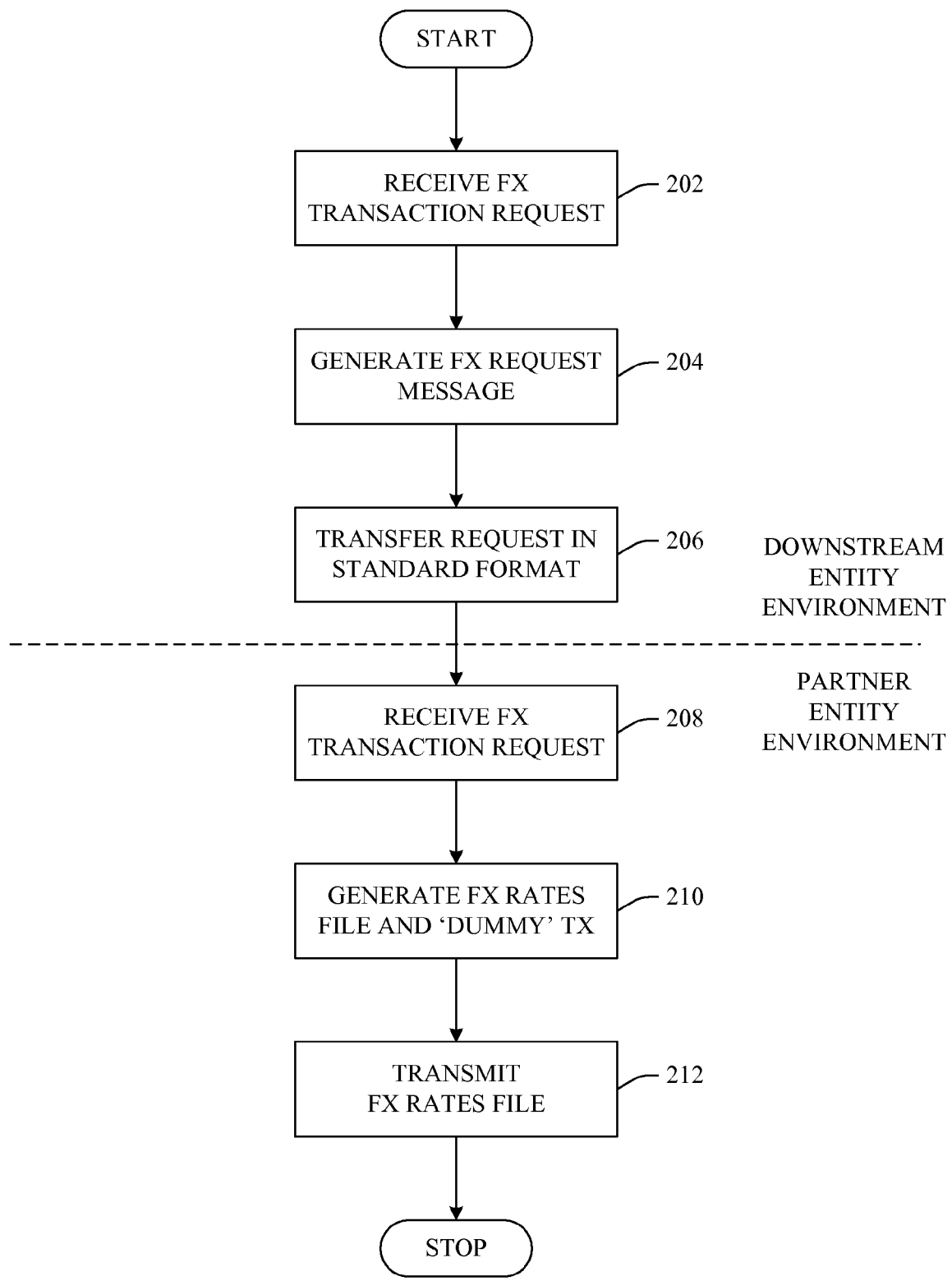
FIG. 2 illustrates an example flow chart of procedures that facilitate generating and transferring an FX message to an FX-equipped entity in accordance with an aspect of the innovation.

FIG. 2 illustrates a methodology of communicating between a non-FX network-equipped entity and an FX network-enabled entity to commence and consummate an FX deal in accordance with an aspect of the innovation. While many of the examples described herein employ the SWIFT network protocol and infrastructure, it is to be understood that the features, functions and benefits disclosed can be applied to most any FX-capable protocol, network or infrastructure. Accordingly, additional examples will be contemplated and are to be included within the scope of this disclosure and claims appended hereto.

While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 202, an FX transaction request can be received within a downstream entity environment. In accordance with the flow diagram shown in FIG. 2, it is to be understood that the downstream entity environment is not FX transaction-enabled whereas the partner entity environment is equipped with the necessary infrastructure to effectuate the FX transaction. In an example, at 202, a customer can contact a downstream bank to prompt an FX transaction request (e.g., payment of a foreign entity in a foreign currency).

Next, at 204, a request message can be generated to commence the FX transaction. It will be understood that many downstream entities and financial institutions have standardized upon domestic solutions to process their domestic transfers and other business transactions. However, unfortunately, many of these downstream correspondent entities have not established the infrastructure required to efficiently and effectively handle FX transactions. Thus, in aspects, the innovation leverages this standardization upon vendor domestic solutions by employing an interface that seamlessly generates FX information that can be transmitted to an FX-enabled entity for processing.

For example, a domestic funds transfer or 'wire room' application is most often responsible for originating, transmitting and receiving domestic payment orders. However, these applications are not equipped to handle FX wire activity.

It will be appreciated that the settlement information for a foreign bank is very unique and different from a FED wire message for a domestic transaction. For example, a SWIFT coding scheme must be used that requires extensive knowledge of the SWIFT systems. Additionally, the bank will have to be intimately knowledgeable of the currency being sent as well as bank identification codes and final beneficiary account notifications needed to complete a FX deal.

The innovation (e.g., system 100) enables an FX rate to be requested via a domestic wire room application (e.g., by way of downstream FX initiation component 102 of FIG. 1) whereby the FX price can be provided in real-time (or almost real-time) (e.g., by way of partner FX processing component 104 of FIG. 1). Referring again to FIG. 2, the FX message or request can be sent in standard (e.g., domestic) format at 206. As illustrated, the flow diagram identifies this message being sent from the downstream entity to a partner entity environment.

At 208, the FX transaction request can be received within the partner entity environment. In response to the request, at

210, an FX rate file can be generated and maintained within the partner entity environment as a 'dummy' or pending transaction. Here, the 'dummy' transaction will not be processed (or injected into the pending FX portfolio) by the partner entity until acknowledged or accepted by the downstream entity. In another example, a 'dummy' transaction is only established upon acceptance of the partner entity's FX rates file. This acknowledgement is addressed in FIG. 3 that follows. At 212, the FX rates file can be transmitted to the downstream entity for review and/or acceptance.

Figure 3:
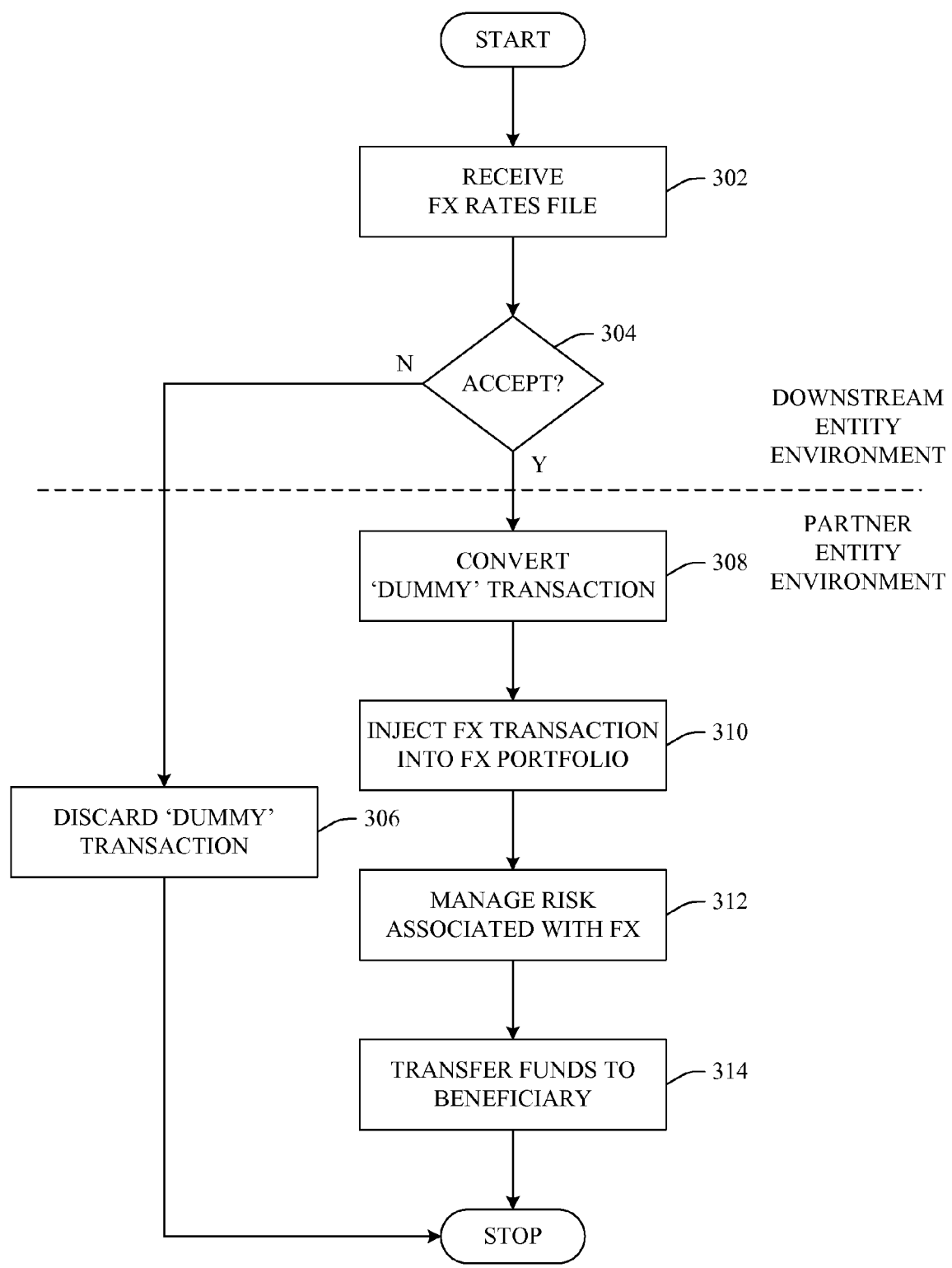
FIG. 3 illustrates an example flow chart of procedures that facilitate processing an FX request in accordance with an aspect of the innovation.

Referring now to FIG. 3, there is illustrated a methodology of processing an FX request in a decoupled environment in accordance with the innovation. Continuing with the flow of FIG. 2, at 302, the FX rates file is received within the downstream entity. A determination of acceptance is made at 304. In other words, the downstream entity (or customer) can decide if the FX rate file is accepted. If not accepted, at 304, the file becomes stale and is discarded. Similarly, at 306, the 'dummy' transaction is discarded from the partner entity environment. It will be appreciated that this discarding of the 'dummy' transaction can be triggered in most any manner, including but not limited to, notification from the downstream entity of denial, time-out, or the like.

If at 304 that price or FX file is accepted, notification can be prompted and sent to the supporting FX entity. In this scenario, the partner FX entity can process the acceptance decision thereby integrating and managing the risk while alleviating the downstream bank of any such risk. Here, the FX-enabled entity can aggregate and manage the risk together with other FX transactions and services provided to other customers as well as those assumed by internal clients.

Essentially, the standard (e.g., domestic) wire room application present within the downstream entity can be equipped with user interfaces (UIs) (e.g., graphical user interface (GUI) screens) that enable FX transactions/settlements to be input into their standard (e.g., domestic) system. Here, the FX entity can transmit pricing and receive notification of acceptance as well as all of the settlement instructions via a secure communication link to the downstream entity.

Although many of the examples described herein are directed to a wire room application, it is to be understood that the features, functions and benefits of the innovation can apply to most any application and/or mechanism of prompting an FX transaction. In other words, the decoupled characteristics of the innovation can be applied in other environments to enable non-FX-equipped entities to leverage the benefits of FX-equipped entities (e.g., risk management, secure global communications, etc.).

In one alternative scenario, the innovation can be used in connection with a cash management application which is a tool most often used by a treasurer or accounting department. For example, if a controller in a company manages accounts receivable/payable which sometimes involve foreign payments, a cash management application is sometimes used to manage and/or transfer these funds. Unfortunately, without FX capabilities, conventionally, this transfer was not possible for foreign transaction. To the contrary, with the subject innovation, an invoice can be received in one currency and can be immediately paid in another sufficient currency. Likewise, the corporate account can be debited automatically for the money. Thus, the innovation can also be integrated into this cash management scenario as well.

Continuing with the example, the manner in which an FX transaction could be initiated is that a downstream correspondent bank (e.g., via downstream FX generation component) can receive some notification from a customer that they need to perform an FX transaction (e.g., they need to buy 1000 pounds). For example, they may need to perform this transaction for one of their corporate customers to pay a bill in a foreign currency.

The downstream bank will enter 1000 GBP into their wire room application, and request price. Next, a message is sent to the FX-equipped entity (e.g., partner) who establishes the price, e.g., using a spot transaction which defines a settlement date. The price is sent back where, at 304, the downstream entity can accept or reject the transaction. Again, if rejected, at 306, the transaction expires and nothing happens.

However, if they accept the price, a message is received at the partner entity that acknowledges acceptance of the price. If a 'dummy trade' was previously created upon quoting the rate, here, this trade is converted into a valid or 'real' transaction. Else, a dummy trade that indicates that a 1000 pounds were just sold to bank ABC is generated. At 310, this trade is injected into or aggregated with the rest of the portfolio where it can be managed together with other current British pound positions (e.g., at 312). It will be appreciated that this scenario relieves the downstream bank of risks involved in managing an FX portfolio.

At 314, funds are transferred to a beneficiary in accordance with payment instructions supplied by the downstream bank (e.g., ABC bank in London, paying John Doe, 1000 GBPs, account number 12345). If not already converted, this information matches off with the 'dummy' trade and converts the 'dummy' trade to a 'real' trade. Accordingly, at 314, this real trade gets routed through the FX-enabled entity's FX system (e.g., SWIFT), gets paid and John Doe gets 1000 GBP credited to his account in two days (time specified by the spot transaction).

As described above, there are many costs associated with processing FX transactions. In addition to being SWIFT-enabled with appropriate interface capabilities, costs are incurred to comply with Office of Foreign Asset Control and other regulatory bodies that govern international transfer of funds, as well as other infrastructure components that contribute to cost and risk. As such, many downstream banks can greatly benefit from the ability to integrate the features, functions and benefits of this innovation into their existing funds management applications. It is to be understood that although the aforementioned example is directed to spot transactions, the innovation can be used in connection with other types of FX transactions. For example, the system 100 can be used in connection with forward and swap transactions without departing from the spirit and scope of the innovation.

Figure 4:
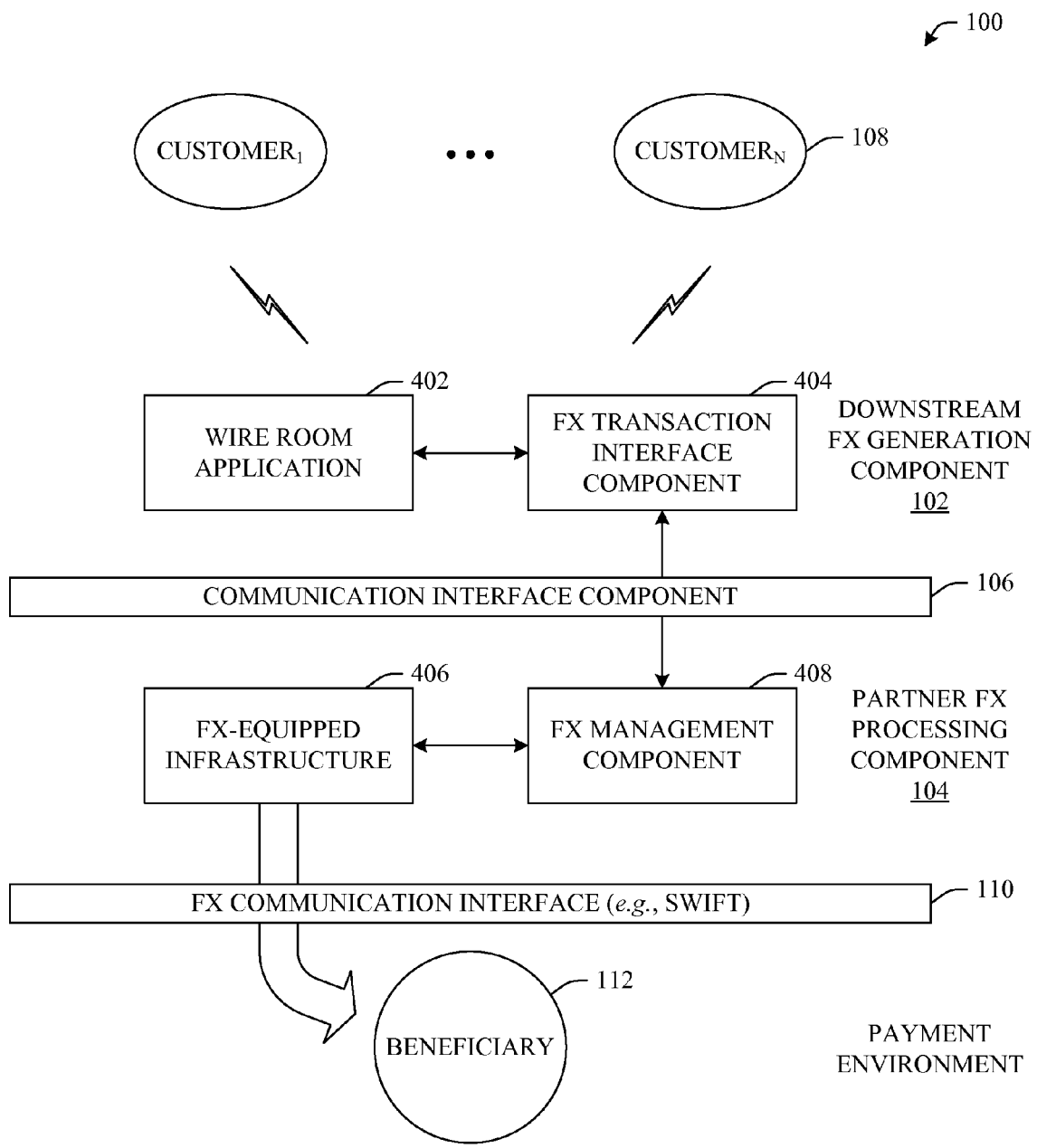
FIG. 4 illustrates an example system that employs a downstream FX transaction interface and a partner-based FX management component to facilitate FX transactions in accordance with an aspect of the innovation.

Turning now to FIG. 4, an alternative block diagram of a system 100 is shown. Generally, the alternative block diagram illustrates that the downstream FX initiation component 102 can include a wire room application 402 and an FX transaction interface component 404. Essentially, this wire room application 402 is representative of most any wire room application known in the art. Moreover, although the wire room application 402 and the FX transaction interface component 404 are shown as separate and distinct components, it is to be understood that the functionalities of these components can be collocated within a single component without departing from the spirit and scope of the innovation.

In one example, the FX transaction interface component 404 can be integrated into an existing wire room application 402. This ability to integrate (as well as retrofit) into existing systems enhances the usability of the functionality as many downstream entities are settled upon a particular wire room application 402.

Similarly, the partner FX processing component 104 can include an FX-equipped infrastructure 406 and an FX management component 408. The FX-management component 408 can receive messages/requests from the downstream FX transaction interface component 404. Additionally, the FX management component 408 can collaborate with the FX-equipped infrastructure component 406 to generate rate files and corresponding transaction entries. The FX management component 408 can communicate rate information to the FX transaction interface component 404 and, upon approval, can inject the approved transaction into existing FX portfolios held and/or managed by the FX-equipped infrastructure 406. Thus, the FX transactions can be managed by the partner FX processing component 104 thereby relieving the downstream entity of risk management and administrative burdens.

As described above, many institutional clients of large national banks are smaller, for example regional, banks. Accordingly, smaller banks may want to offer FX services to their customers (e.g., corporations, individuals) but, may not have the infrastructure or resources to effectively offer and manage the transactions. For example, conventionally, if smaller banks have this FX offering at all, what they are typically forced to do is a manual process that requires multiple systems and/or entries. For instance, the smaller bank will have to access their payment processing system to verify that their customer has adequate United States dollar funds. Next the smaller bank will have to manually contact their bank (e.g., larger national bank) to get an FX price. Finally, the smaller will have to employ one or more of their bank's domestic wire platforms to effect the transfer of the funds, since they are not connected to an international wire system. Thus, the smaller bank would have to perform dual entry (e.g., domestic debit, and foreign deposit). Because multiple systems are used, in addition to increased cost, it will be understood that manual entry is prone to error as human error can easily happen in transferring the information.

Contrary to conventional systems, the subject innovation consolidates processes in that a bank will only have to enter the information a single time with respect to an FX transaction. As a result, a bank will easily be able to access current FX rates to satisfy their customer's needs while, correspondingly, they will not have to manage the risk associated with FX deals. Essentially, the system 100 decouples the processes between a downstream entity (e.g., smaller bank) and a partner FX-equipped entity (e.g., national bank). This is facilitated through the FX transaction interface component 404 together with the FX management component 408.

Figure 5:
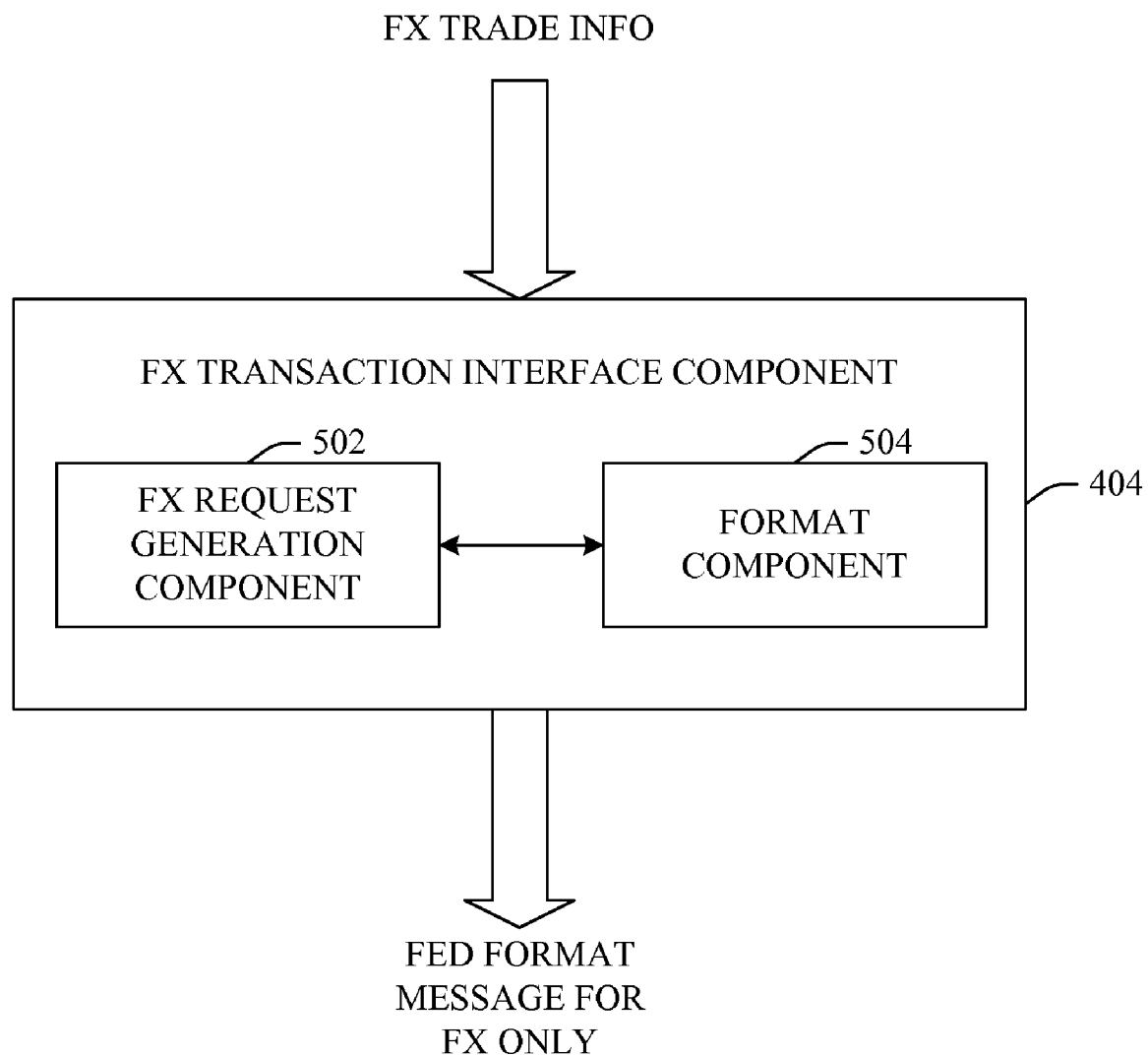
FIG. 5 illustrates an example block diagram of an FX transaction interface component in accordance with an aspect of the innovation.

Referring now to FIG. 5, a block diagram of an example FX transaction interface component 404 is shown. Generally, the FX transaction interface component 404 can include an FX request generation component 502 and a format component 504. Together, these sub-components facilitate generation and formatting of messages to/from a partner FX-equipped environment. In one example, the format component 504 configures the FX trade request information provided by the FX request generation component 502 into a FED format (or other desired format) consistent with a standard wire room application.

While this example indicates that the format component 504 configures the FX trade information (e.g., request) into a format consistent with FED systems, it is to be understood that most any format can be employed in alternative embodiments. For instance, customer specific formats can be established which make identification by the partner FX-equipped entity more easily distinguishable. Moreover, the format component 504 can employ cryptographic mechanisms to protect and/or digitally sign FX request traffic sent to the partner FX-equipped entity.

Figure 6:
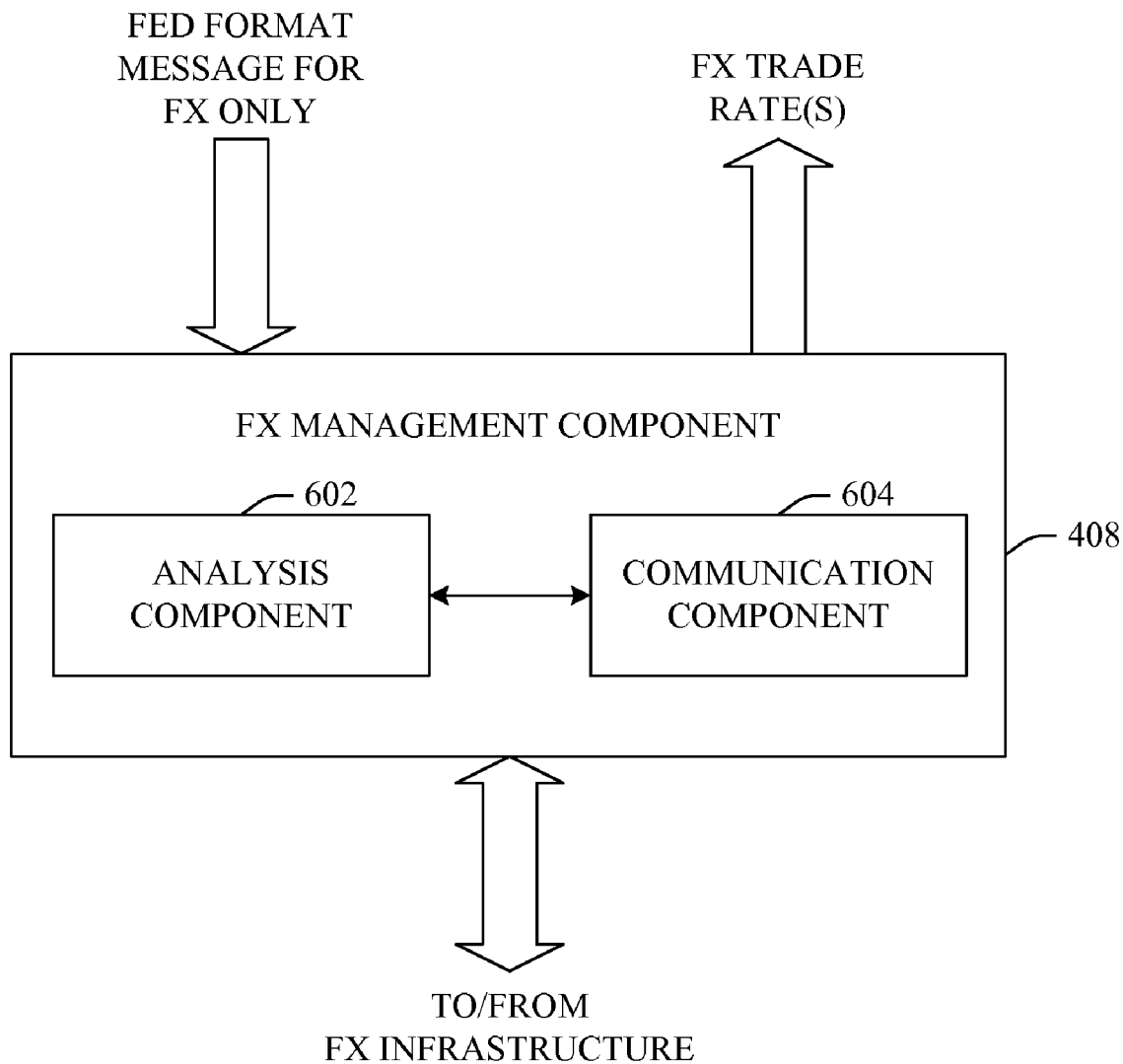
FIG. 6 illustrates an example block diagram of an FX management component in accordance with an aspect of the innovation.

Referring now to FIG. 6, an example FX management component 408 is shown. Generally, the FX management component 408 includes an analysis component 602 and a communication component 604. As shown, the FX management component 408 (which interacts with the FX infrastructure) can receive a FED formatted message that contains FX request information. These FX request messages can be filtered by the downstream-located FX transaction interface component (404 of FIG. 4).

Upon receipt, the analysis component 602 can evaluate the message and thereafter extract FX transaction information. Additionally, if required, the analysis component can decrypt the message, for example using a private key of a public/private key pair. Once the information is extracted, the FX management component 408 can communicate with the partner environment FX infrastructure to access FX rate information. Subsequently, the communication component 604 can be employed to convey this information to the downstream entity environment, and particularly to the FX transaction interface component 404.

Subsequent messages can be transmitted as needed to consummate the FX deal. For instance, acceptance notification, transaction details (e.g., account name, bank name), request modifications, etc. can be securely exchanged between the downstream entity and the FX-equipped partner entity. As shown in FIG. 1, this secure communication can be effectuated via communication interface component 106 which can be, for example, a dedicated network connection between the entities.

Figure 7:
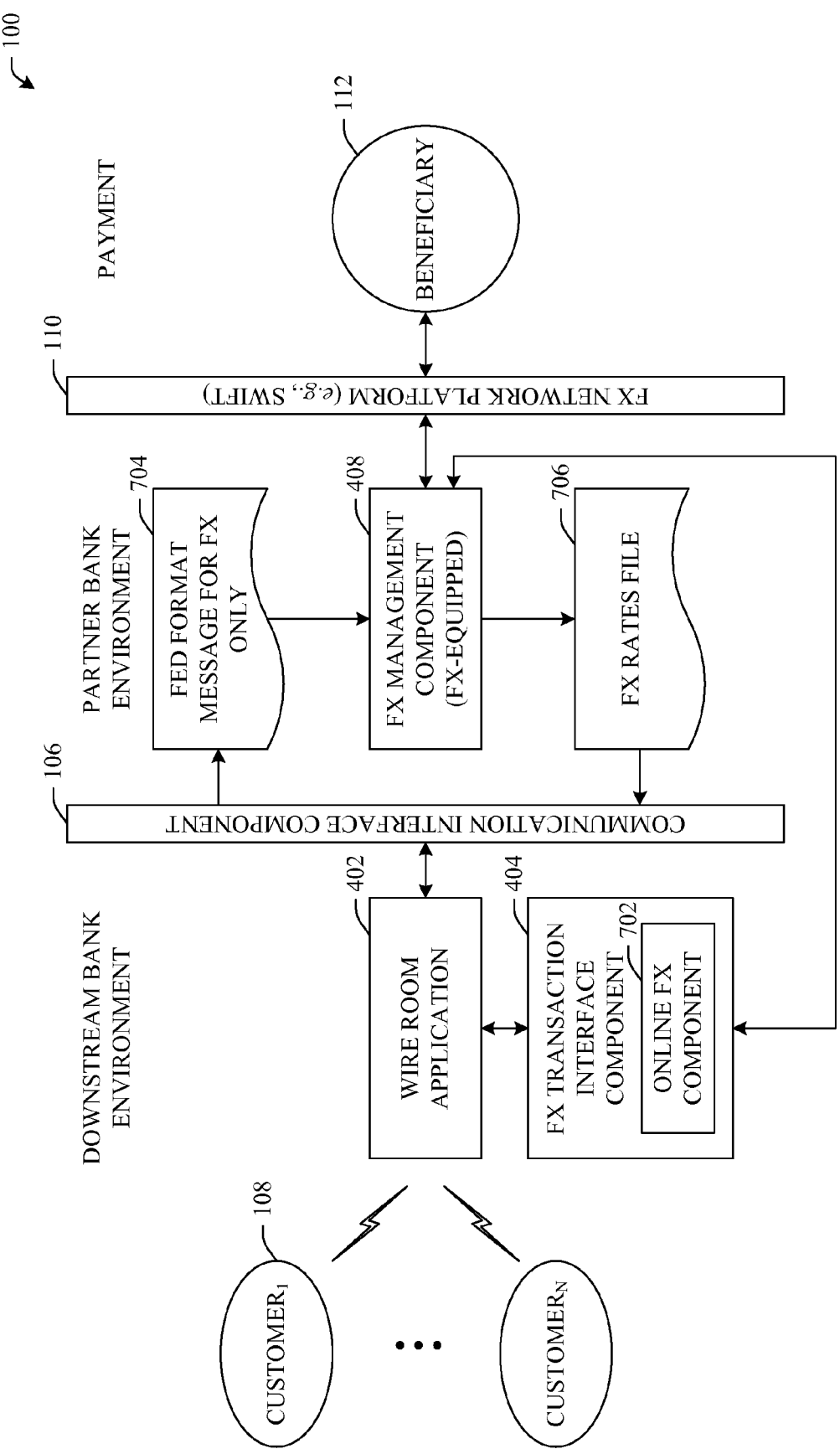
FIG. 7 illustrates an alternative block diagram of an architecture that employs a downstream wire room application to initiate an FX transfer in accordance with an aspect of the innovation.

FIG. 7 illustrates yet another example block diagram of system 100 that facilitates employment of an FX management component 408 within a partner bank environment to process an FX transaction request generated within a downstream bank environment. In this example, an FX transaction interface component 404 can be employed to initiate an FX request. Optionally, a customer (e.g., corporation, individual) can access the FX transaction interface component 404 by way of an online (e.g., Internet, intranet) component 702.

This FX request can be communicated through a standard (e.g., domestic) wire room application 402 to a partner bank environment for processing. As shown, the FX request can be sent via a communication interface component 106. The FX request can be in a FED format message that represents only FX requests (704). In other words, the wire room application can filter and transmit only the FED format messages that relate to FX transaction requests.

An FX-equipped management component 408 can process the request and subsequently return an FX rates file 706 by way of communication interface component 106. As described above, messages can be securely sent between the downstream bank environment and the partner bank environment in order to acknowledge the transaction and, if accepted, to convey necessary information to consummate the transaction. Subsequently, funds can be transferred to the beneficiary 112 by way of an FX network platform such as SWIFT (110). Here, it is to be understood that the FX network platform can be maintained and managed solely by the partner bank thereby alleviating the downstream bank(s) of any management and/or risk responsibilities and accompanying expense.

Figure 8:
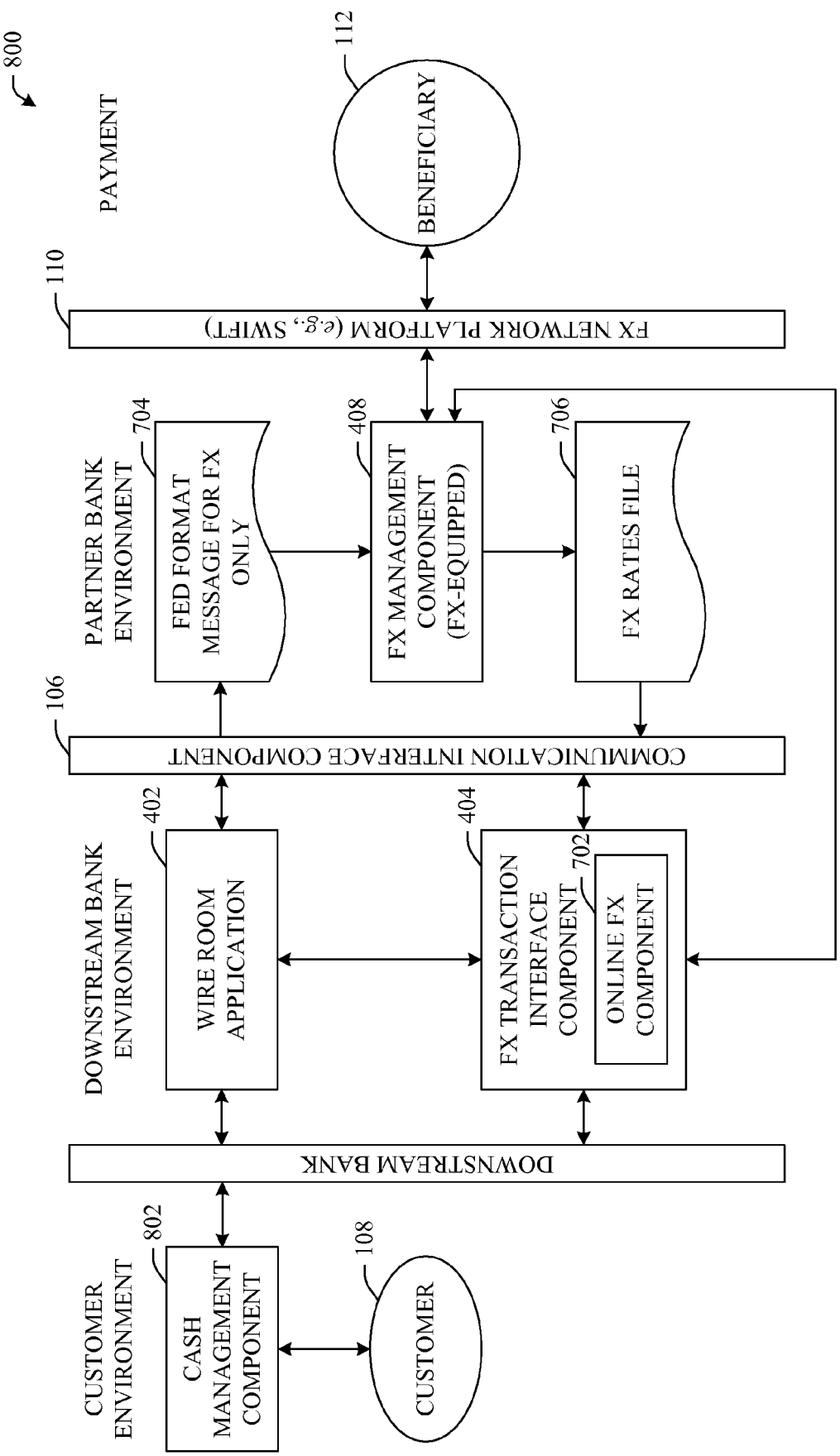
FIG. 8 illustrates an alternative block diagram of an architecture that employs a cash management system to initiate an FX transfer in accordance with an aspect of the innovation.

FIG. 8 illustrates yet another system 800 that facilitates remotely providing FX infrastructures to downstream banks while alleviating such banks of risks and costs associated with the infrastructure. Overall, the functionality of the system 800 is similar to that of system 100 previously described in detail supra. It is to be understood that like-named and like-numbered elements share functionality as previously described.

As described with reference to the alternative methodology of the discussion of FIG. 3 supra, system 800 can include a cash management component 802 that enables a customer 108 to directly access FX-infrastructure capabilities. In particular, the cash management component 802 enables a customer to prompt FX transactions (e.g., foreign invoice payments) directly from their environment or desktop. In one aspect, the cash management component 802 can communicate directly with the FX transaction interface component 404. In another embodiment, the cash management component 802 can communicate with a wire room application 402 to initiate the FX transaction functionality.

Figure 9:
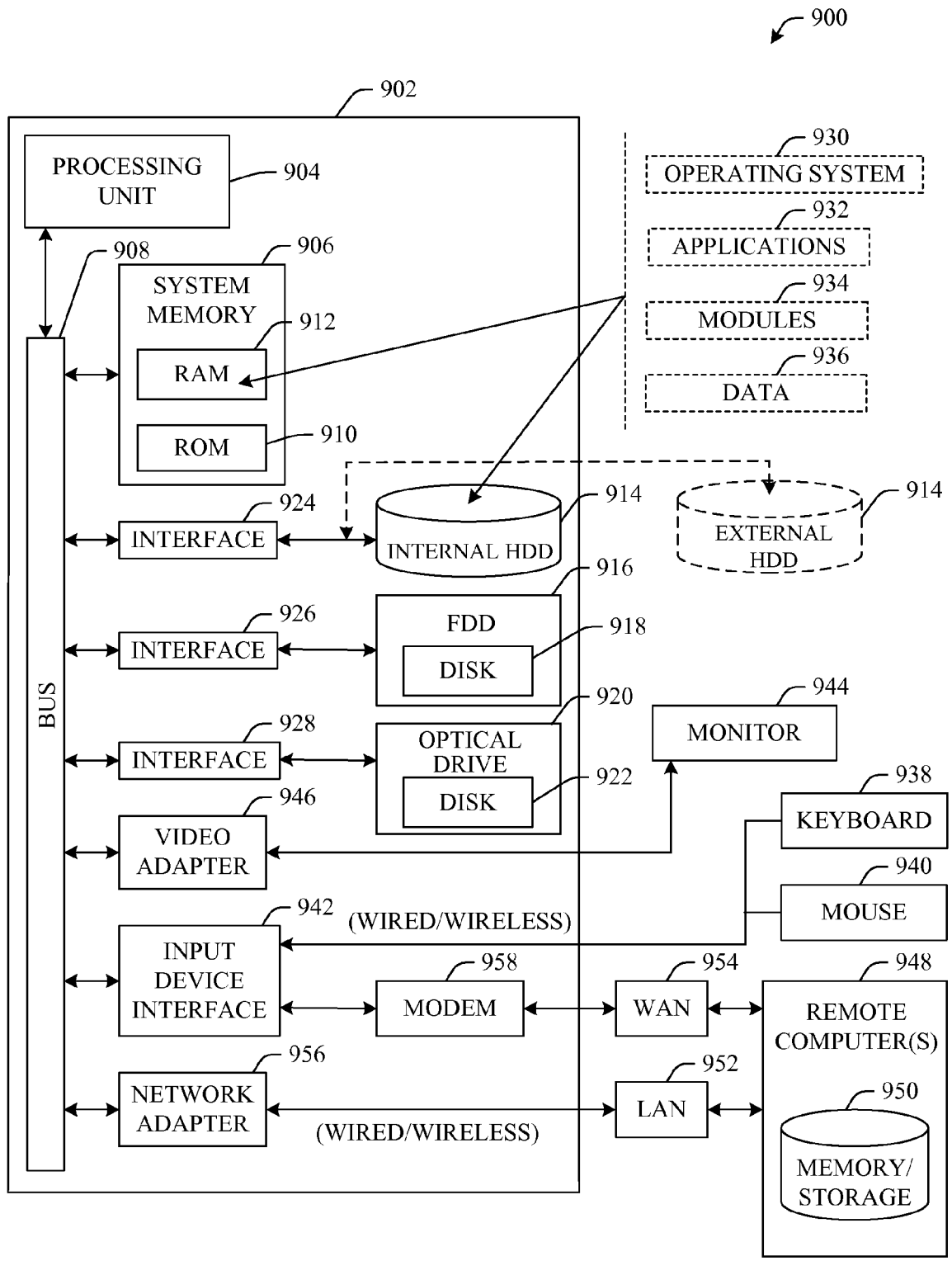
FIG. 9 illustrates a block diagram of a computer operable to execute the disclosed architecture.

Referring now to FIG. 9, there is illustrated a block diagram of a computer operable to execute the disclosed architecture. In order to provide additional context for various aspects of the subject innovation, FIG. 9 and the following discussion are intended to provide a brief, general description of a suitable computing environment 900 in which the various aspects of the innovation can be implemented. While the innovation has been described above in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 9, the exemplary environment 900 for implementing various aspects of the innovation includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the innovation.

A number of program modules can be stored in the drives and RAM 912, including an operating system 930, one or more application programs 932, other program modules 934 and program data 936. All or portions of the operating system, applications, modules, and/or data can also be cached in the RAM 912. It is appreciated that the innovation can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 via an interface, such as a video adapter 946. In addition to the monitor 944, a computer typically includes other peripheral output devices (not shown), such as speakers, printers, etc.

The computer 902 may operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which may connect to a global communications network, e.g., the Internet.

When used in a LAN networking environment, the computer 902 is connected to the local network 952 through a wired and/or wireless communication network interface or adapter 956. The adapter 956 may facilitate wired or wireless communication to the LAN 952, which may also include a wireless access point disposed thereon for communicating with the wireless adapter 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 10:
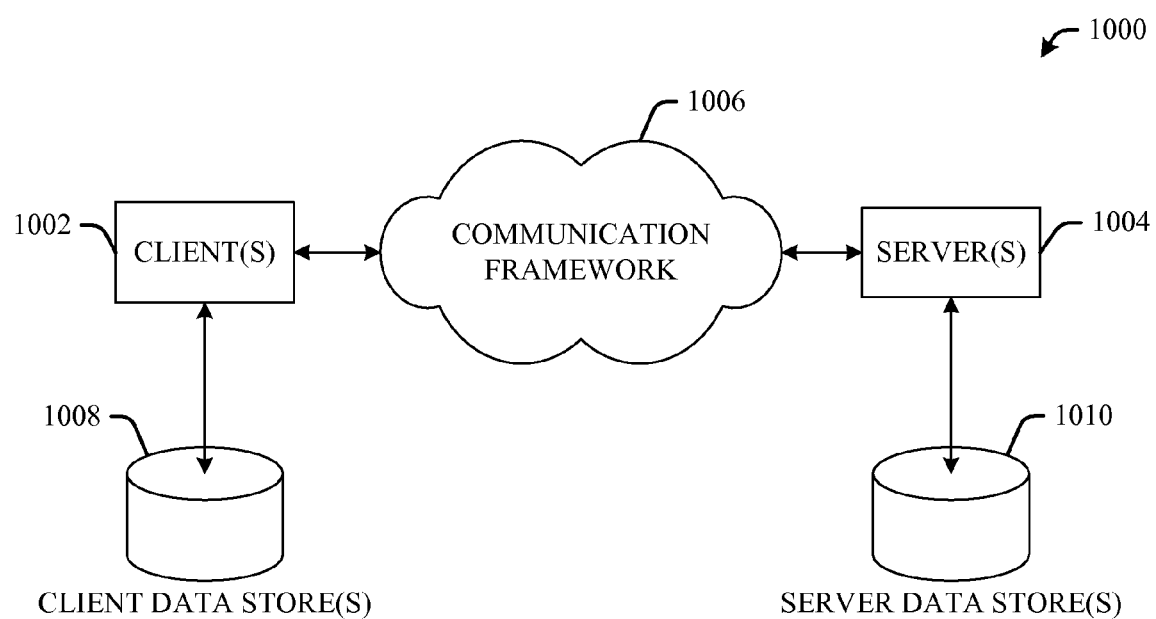
FIG. 10 illustrates a schematic block diagram of an exemplary computing environment in accordance with the subject innovation.

Referring now to FIG. 10, there is illustrated a schematic block diagram of an exemplary computing environment 1000 in accordance with the subject innovation. The system 1000 includes one or more client(s) 1002. The client(s) 1002 can be hardware and/or software (e.g., threads, processes, computing devices). The client(s) 1002 can house cookie(s) and/or associated contextual information by employing the innovation, for example.

The system 1000 also includes one or more server(s) 1004. The server(s) 1004 can also be hardware and/or software (e.g., threads, processes, computing devices). The servers 1004 can house threads to perform transformations by employing the innovation, for example. One possible communication between a client 1002 and a server 1004 can be in the form of a data packet adapted to be transmitted between two or more computer processes. The data packet may include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented method of processing a foreign exchange (FX) transaction, comprising:
   receiving an FX transaction request, wherein the FX transaction request is received at a non-FX transaction-equipped downstream financial entity;
   employing a domestic funds transfer system to generate an FX request message, wherein the FX request message is formatted in a standard domestic format consistent with the domestic funds transfer system and wherein the domestic funds transfer system is located at the non-FX transaction-equipped downstream financial entity;
   transmitting the FX request message to an FX transaction-equipped partner financial entity; and
   receiving a rate file at the non-FX transaction equipped downstream financial entity from the FX transaction-equipped partner financial entity based upon the FX request message, wherein the rate file comprises rate information in response to the FX transaction request; and establishing, via a processor, a 'dummy' transaction at the FX transaction-equipped partner financial entity that reflects information included in the FX request message, wherein the 'dummy' transaction is pending based upon a determination from the non-FX transaction-equipped downstream financial entity that information in the rate file is accepted;

receiving acknowledgement or acceptance of the rate file from the downstream financial entity;

converting the 'dummy' transaction to a 'real' transaction; and injecting the 'real' transaction into a partner-managed FX portfolio.

2. The computer-implemented method of claim 1, wherein the act of transmitting employs a dedicated communication interface that facilitates exchange between the downstream financial entity and the partner financial entity.

3. The computer-implemented method of claim 1, further comprising:

receiving the FX request message at the partner financial entity; and generating the FX rate file based upon content of the FX request message.

4. The computer-implemented method of claim 1, further comprising employing a partner-managed FX communication interface to transfer funds to a beneficiary in accordance with the 'real' transaction.

5. The computer-implemented method of claim 4, the partner-managed FX communication interface is a SWIFT-enabled interface.

6. A system that facilitates an FX transaction, comprising:

a storage device that facilitates storage of computer executable instructions;

a processor that executes the computer executable instructions stored in the storage device to implement the following components:

a downstream FX initiation component that generates an FX request and communicates the FX request to a partner financial entity via a dedicated communication interface, wherein the downstream FX initiation component is located at a correspondent financial entity; and an FX processing component located at the partner financial entity that responds to the FX request and accomplishes the FX transaction on behalf of the correspondent financial entity as a function of the FX request, wherein the FX processing component establishes a 'dummy' transaction that reflects information included in the FX request, and wherein the 'dummy' transaction is a pending transaction until receipt of an affirmative acknowledgement or acceptance of the FX request response from the correspondent financial entity; and wherein, upon receiving acknowledgement or acceptance of the rate file from the downstream financial entity, the FX processing component converts the 'dummy' transaction to a 'real' transaction and injects the 'real' transaction into a partner-managed FX portfolio.

7. The system of claim 6, further comprising an FX transaction interface that receives a customer input and interacts with a domestic funds transfer component to initiate the FX request, wherein the FX request is formatted in a domestic transaction format.

8. The system of claim 6, further comprising the domestic funds transfer component that interacts with the downstream FX initiation component to trigger the FX request.

9. The system of claim 7, further comprising:

an FX request generation component facilitates establishment of the FX request; and a format component that configures the FX request for communication to the FX processing component located at the partner financial entity.

10. The system of claim 9, the format component cryptographically secures the FX request for communication to the FX processing component.

11. The system of claim 7, further comprising an analysis component that evaluates the FX request and generates an FX rate file, the FX transaction is based upon the FX rate file.

12. The system of claim 7, further comprising a communication component that transmits and receives information to/from the downstream FX initiation component to effectuate acknowledgement of the FX rate file.

13. A computer-executable system that facilitates FX transactions, comprising:

a memory that facilitates storage of computer executable instructions;

a processor that executes the computer executable instructions stored in the memory to implement the following:

means receiving an FX transaction request at a non-FX-enabled financial entity;

means for establishing an FX message;

means for securely transmitting the FX message to an off-site FX-enabled financial entity;

means for receiving and evaluating an FX rate quote at the off-site FX-enabled financial entity, wherein the FX rate quote is based upon the FX message; and means for establishing a 'dummy' transaction at the off-site FX-enabled financial entity that reflects information included in the FX message, wherein the 'dummy' transaction represents a pending transaction contingent upon a determination received from the non-FX-enabled financial entity that the FX rate quote is accepted;

means for receiving acknowledgement or acceptance of the rate file from the downstream financial entity;

means for converting the 'dummy' transaction to a 'real' transaction; and means for injecting the 'real' transaction into a partner-managed FX portfolio.

14. The system of claim 13, further comprising:

means for accepting the rate quote; and means for transmitting transfer information in accordance with the FX transaction request.

15. The system of claim 14, further comprising means for employing off-site FX capability to effectuate transfer of funds in accordance with the transfer information.

16. The system of claim 15, wherein the off-site FX capability is a partner managed SWIFT-enabled network.

17. The system of claim 13, wherein the means for securely transmitting the FX message is a dedicated communication interface between the non-FX-enabled financial entity and the off-site FX-enabled financial entity.

18. The system of claim 13, further comprising means for cryptographically securing data traffic to/from the off-site FX-enabled financial entity.

19. The method of claim 1, further comprising discarding a 'dummy' transaction that has become stale.

* * * * *